United States Patent
Yogev et al.

(10) Patent No.: US 10,664,525 B2
(45) Date of Patent: May 26, 2020

(54) DATA PARTIONING BASED ON END USER BEHAVIOR

(71) Applicant: MICRO FOCUS LLC, Santa Clara, CA (US)

(72) Inventors: Inbar Yogev, Yehud (IL); Ira Cohen, Modiin (IL); Olga Kogan-Katz, Yehud (IL); Lior Ben Ze'ev, Petah Tikva (IL)

(73) Assignee: MICRO FOCUS LLC, Santa Clara, CA (US)

( * ) Notice: Subject to any disclaimer, the term of this patent is extended or adjusted under 35 U.S.C. 154(b) by 520 days.

(21) Appl. No.: 15/583,667

(22) Filed: May 1, 2017

(65) Prior Publication Data

US 2017/0235847 A1    Aug. 17, 2017

Related U.S. Application Data

(63) Continuation of application No. 13/780,751, filed on Feb. 28, 2013, now Pat. No. 9,665,636.

(51) Int. Cl.
| | | |
|---|---|---|
| *G06F 16/00* | (2019.01) | |
| *G06F 16/901* | (2019.01) | |
| *G06F 16/27* | (2019.01) | |
| *G06F 16/2457* | (2019.01) | |

(52) U.S. Cl.
CPC .... *G06F 16/9024* (2019.01); *G06F 16/24578* (2019.01); *G06F 16/278* (2019.01)

(58) Field of Classification Search
CPC ................................................. G06F 17/30958
See application file for complete search history.

(56) References Cited

U.S. PATENT DOCUMENTS

| | | |
|---|---|---|
| 7,562,090 B2 | 7/2009 | Lohman et al. |
| 7,720,773 B2 | 5/2010 | Szummer et al. |
| 8,051,032 B2 | 11/2011 | Cooper et al. |
| 8,086,583 B2 | 12/2011 | Crutchfield et al. |
| 8,156,304 B2 | 4/2012 | Friedman et al. |
| 2007/0016558 A1* | 1/2007 | Bestgen ............ G06F 17/3053 |
| 2007/0288495 A1* | 12/2007 | Narasayya ........ G06F 17/30306 |
| 2010/0030793 A1* | 2/2010 | Cooper ............. G06F 17/30339 707/602 |
| 2011/0035397 A1* | 2/2011 | Joshi ................. G06F 17/30637 707/759 |

OTHER PUBLICATIONS

Jeanna Neefe Matthews et at, "improving the Performance of Log-Structured File Systems with Adaptive Methods", ACM Symposium, Saint Malo, France, Oct. 5-8, 1997, 24 pages.

* cited by examiner

*Primary Examiner* — Apu M Mofiz
*Assistant Examiner* — Farhad Agharahimi

(57) ABSTRACT

End user data partitioning can include receiving a number of data queries for a data source from a user, developing a dimension relation graph based on attributes of the number of data queries, and partitioning the data source based on the dimension relation graph.

20 Claims, 3 Drawing Sheets

DATA PARTIONING BASED ON END USER BEHAVIOR

PRIORITY APPLICATION INFORMATION

This application is a continuation of U.S. application Ser. No. 13/780,751 filed on Feb. 28, 2013. The contents of which are incorporated herein by reference in its entirety.

BACKGROUND

A data retrieval operation can follow response times that are specified by a product manager and/or customer. The specified response times can be required for data capacity stored within a particular system. It may be difficult to maintain specified response times as systems scale to larger data capacity.

DETAILED DESCRIPTION

Partitioning of a data source (e.g., database, collection of data, distributed cache, flat file, etc.) can include dividing the data source into a number of distinct partitions (e.g., independent parts, number of metrics, etc.). Partitioning of the data source can include attempting to store data with similar attributes (e.g., dimensions, filtering conditions, etc.) in the same partition. Storing data with similar attributes in the same partition can create performance differences for different users based on a particular user's query type frequency (e.g., frequency of performing a particular query, frequency of performing a query with particular attributes, etc.).

By partitioning the data source based on the particular user's query type frequency, the data source can include distinct partitions of data that will be customized for the particular user. Having customized distinct partitions for the particular user can increase performance of retrieving data from the data source utilizing queries. In addition, the data source partitioning can be adaptive to the particular user by continually monitoring the particular user's query type frequency and dynamically partitioning the data source based on changes and/or consistencies of the particular user's query type frequency.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

As used herein, "a" or "a number of" something can refer to one or more such things. For example, "a number of nodes" can refer to one or more nodes.

Figure 1:
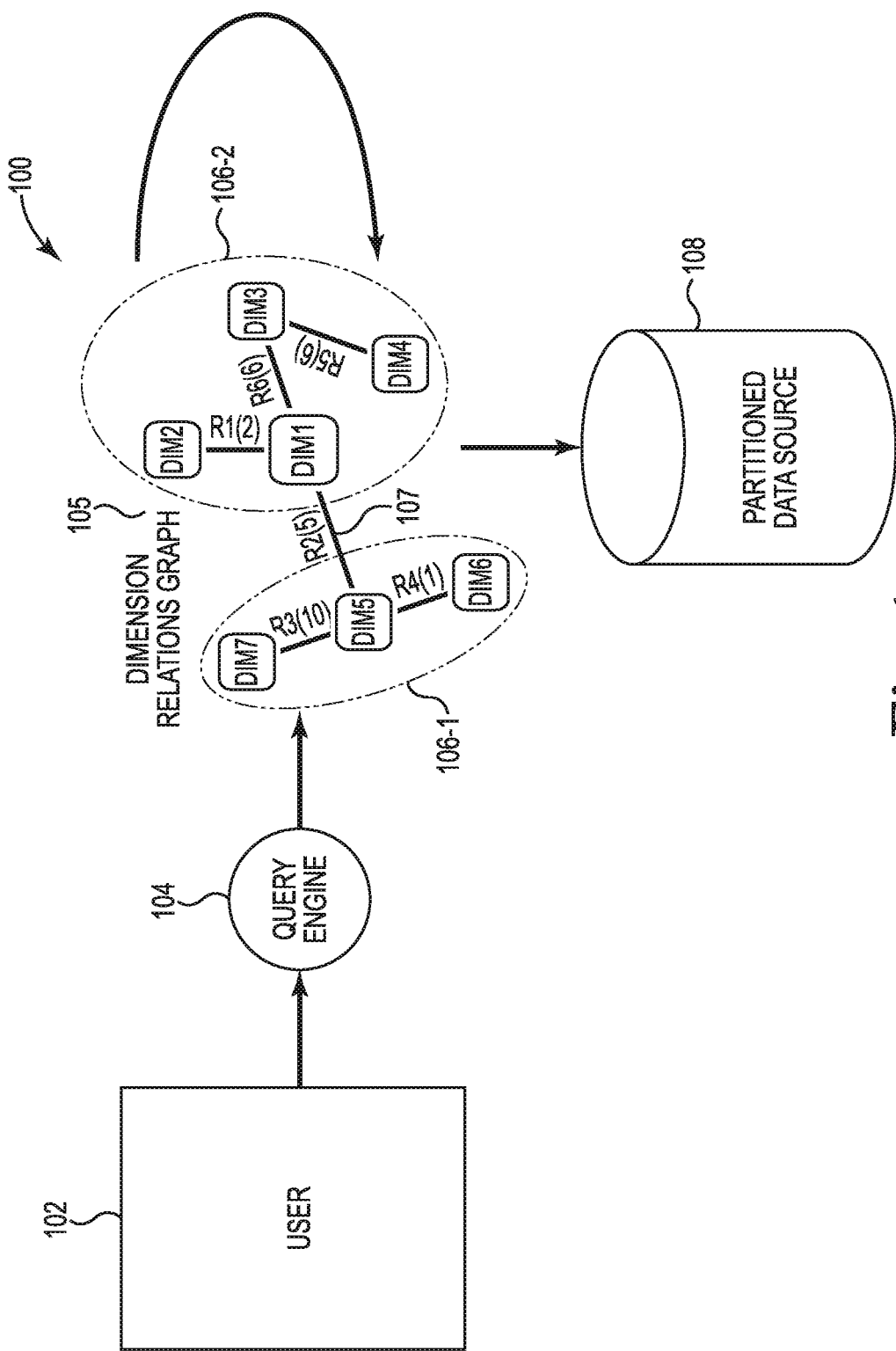
FIG. 1 illustrates a diagram of an example of an end user data partitioning system according to the present disclosure.

FIG. 1 illustrates a diagram of an example of an end user data partitioning system 100 according to the present disclosure. The end user data partitioning system 100 can be used to dynamically partition a data source 108 (e.g., database, machine readable medium, data store, distributed cache, flat file etc.) based on a query type frequency of a user 102. For example, the user 102 can request a first query that includes a first number of attributes at a first frequency (e.g., number of times a query is requested, number of times per unit time that a query is requested, etc.). In this example, when the first frequency of the first query is relatively high, it can be determined that data relating to the first number of attributes should be partitioned within a single partition (e.g., single metric, bulk ID, etc.) of the data source 108.

The user 102 can be a human and/or non-human (e.g., reporting framework, web page, etc.) user of the data source 108. For example, the data source 108 can include various information that a human user can request and reports can be produced (e.g., interpretations of the information and/or data, visual representation, etc.) utilizing an interface (e.g., visual interface, etc.). The data source 108 can be partitioned in a number of ways. For example, the data source 108 can be partitioned based on a time (e.g., time data was saved to the data source, etc.) and/or a bulk ID (e.g., every 1,000 metrics a synthetic bulk ID is created, etc.).

The user 102 can request a query from the data source 108 utilizing a query engine 104. The query engine 104 can be a system component (e.g., hardware, software, logic and/or a combination thereof) that can be responsible for translating a number of queries (e.g., user queries, etc.) passed to the data source 108. For example, the user 102 can select a number of options, e.g., define and/or request particular parameters, and the query engine 104 can translate the number of options to a query that can be passed (e.g., sent via communication link, etc.) on to the data source 108. In addition, the query engine can return the results of the query to the user 102. For example, the query can be passed on to the data source 108, via the query engine 104, and a number of results can be provided and translated into a report that can be returned and analyzed by the user 102.

The number of queries passed to the data source 108 can be monitored, e.g., analyzed, and used to generate a dimension relation graph 105. The dimension relation graph 105 can include a number of nodes (e.g., node 106-1, node 106-2, etc.). The number of nodes, 106-1, 106-2, . . . , etc., can include attributes and/or dimensions that can relate to a particular data location (e.g., particular partition within the data source 108, particular filtering condition used for the query, the query type, etc). For example, node 106-1 can have attributes, e.g., dimension (DIM) 7, DIM 5 and DIM 6, that include a transaction ID, a time the query was requested, and/or a particular partition within the data source 108. Each of the number of nodes, 106-1, 106-2, . . . , etc., can correspond to a particular partition within the data source 108 that is used in fetching the queried data and to provide a report to the user.

In the example of FIG. 1, the attributes and/or dimensions can be represented by Dim 7, Dim 5, and Dim 6. The attributes and/or dimensions can be linked by a number of vertices, e.g., R3, R4, R6, etc., based on a relationship (e.g., number of times the attributes are queried by the user 102, etc.) between the attributes and/or dimensions. For example, the attribute Dim 7 can be linked to attribute Dim 5 by a vertex R3.

Each of the number of vertices can be given a weight. In the example of FIG. 1, the vertex R3 can be given a weight, e.g., "(10)", based on a number of times that attribute Dim 7 and Dim 5 are queried by the user 102 during the same query. The number of attributes 106-1, 106-2, . . . , etc., can be greater or less than the number of attributes and/or nodes shown in FIG. 1 based on the type of query and/or number of attributes monitored. For example, for a particular type of query a greater number of attributes, DIM 7, DIM5, DIM 6 (e.g., greater than three attributes) and/or a greater number of nodes, 106-1 and 106-2 (e.g., greater than two nodes) can be utilized to increase granularity of the dimension relation graph 105 when utilizing a particular type of query.

The individual weights, e.g., "(10)" and "(1)", of each of the vertices, e.g., R3 and R4, that link each of the attributes, e.g., DIM 7, DIM 5 and DIM 6, within a particular node, e.g., 106-1, can be used to determine a weight of each of the number of nodes. For example, the weights of vertex R1, vertex R6, and vertex R5 can be used to calculate a node weight for node 106-2. The node weight can be based on the relationship between the attributes and/or dimensions within each node. That is, the greater the relationship between the attributes (e.g., weight of the vertices linking the attributes, etc.) the greater the node weight can be for a particular node.

The node weight can also be based on a quantity (e.g., frequency, etc.) of the data within the data source 108 that corresponds to the attributes and/or dimensions. The quantity of the data within the data source 108 can represent a significance value of the node, e.g., the higher the quantity of date, the higher the significance value. For example, the significance value for node 106-1 can correspond to a quantity of data relating to attributes of Dim 7, Dim 5, and Dim 6. A greater quantity of data relating to particular attributes within the data source 108 can correspond to giving a greater node weight and/or significance value to the particular node.

Each of the number of nodes (e.g., node 106-1, node 106-2, etc.) can be linked using a vertex. For example, node 106-1 can be linked to node 106-2 utilizing vertex 107 (R2(5)). Each of the number of nodes can be linked to a different node when the different nodes are requested by the user 102 in the same query. For example, node 106-1 can be linked to node 106-2 utilizing vertex 107 (R2(5)) when node 106-1 and node 106-2 are requested by the same query.

A weight, e.g., "(5)", can be given to each of the number of vertices 107, e.g., R2(5), that link the number of nodes, e.g., 106-1 and 106-2. The weight, e.g., "(5)", can represent a quantity of times that the user 102 requests a query that includes the linked nodes. For example, a weight "(5)" can be given to vertex 107 that relates to a quantity of times, e.g., five times, a user requests a query where node 106-1 and node 106-2 are included in the query.

The dimension relation graph 105 can include: the attributes and/or dimensions of a number of queries grouped into the number of nodes 106-1, 106-2, . . . , etc., weight values, e.g., "(10)", "(1)", "(6)", for vertices, e.g., R3(10), R4(1), and R6(6), linking the number of attributes and/or dimensions, e.g., DIM 7, DIM 5, DIM 6, DIM 1, DIM 3, etc., weight values for the number of nodes, and/or weight values, e.g., "(5)", for vertices, e.g., R2(5), linking the number of nodes 106-1 and 106-2. The dimension relation graph 105 can continuously update, e.g., change nodes and weights, to reflect the various, changing query request from the user 102. For example, a number of monitors, e.g., computer executable instructions stored in memory and executed by a processing resource such as a memory 348 and processing resource 342 in FIG. 3, can be used to collect the query requests and attributes of the data within the data source to update the dimension relation graph 105.

The dimension relation graph 105 can be used to partition the data source 108. The dimension relation graph 105 can be utilized to determine attributes and/or dimension values that are most commonly used together by the user 102. That is, the data source 108 can be partitioned so that attributes and/or dimension values that are most commonly used are located within the same partition of the data source 108. The performance of retrieving data by utilizing the query engine 104 can be increased by locating attributes and/or dimension values that are most commonly used by the user 102 within the same partition. For example, a system can utilize specified response times for retrieving data from a particular partition within the data source 108. In this example, it can take more resources and/or more time to perform a query of data that is located in multiple partitions compared to a query of data that is located within a single partition. That is, the number of input/output (IO) operations when retrieving data by query can be reduced and in addition the performance of the system 100 can be increased.

The data source 108 can be partitioned in a number of balanced partitions based on the dimension relation graph 105. For example, the data source 108 can be partitioned into a number of units that are sub-divided equally. In another example, the data source 108 can be partitioned in two levels such as a first level that is based on a particular time period (e.g., one hour, etc.) and a second level that includes a bulk ID for a set of metrics (e.g., 1,000 metrics, etc.).

The dimension relation graph 105 can also provide an adaptive system of end user partitioning. For example, the user 102 can change their query type frequency for a number of reasons (e.g., change in business strategy, different responsibility and/or assignment, etc.). In this example, the dimension relation graph 105 can be continuously updated to reflect the change in the query type frequency and the data source 108 can be partitioned to reflect the change. That is, the dimension relation graph 105 can be used to dynamically (e.g., periodically, automatically, etc.) partition the data source 108 based on changes in end user behavior (e.g., behavior of a single user, behavior of a group of users, etc.) and/or changes in the dimension relation graph 105. The changes in end user behavior can be monitored in real time and the monitored behavior can be used to update the dimension relation graph 105 in real time.

Figure 2:
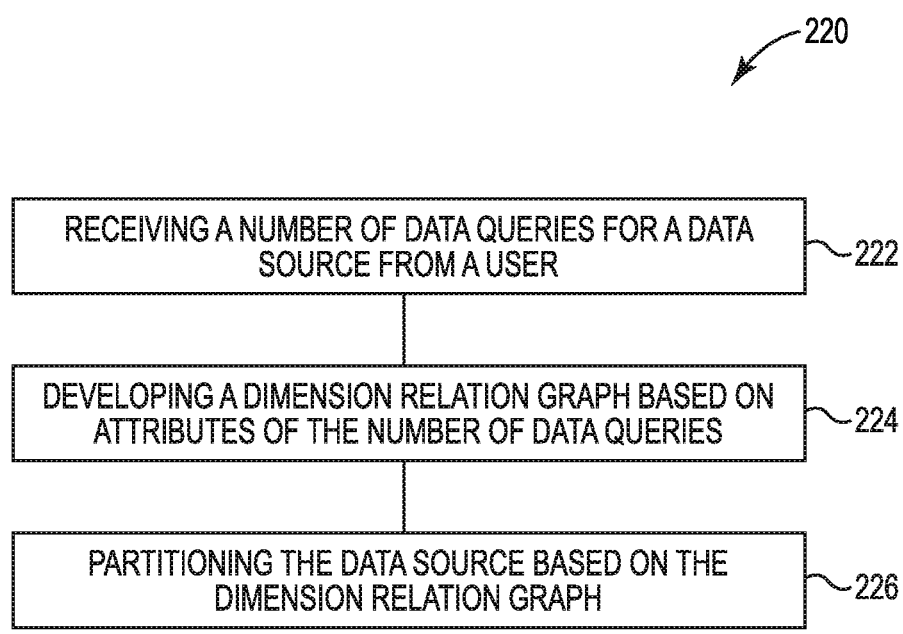
FIG. 2 illustrates a flow diagram for an example of a method for end user data partitioning according to the present disclosure.

FIG. 2 illustrates a flow diagram for an example of a method 220 for end user data partitioning according to the present disclosure. The method 220 can provide a dynamic and adaptive method of partitioning a data source based on end user behavior. The method 220 can provide a partitioned data source that is customized to a particular user for increased performance of the user's query type frequency.

At box 222 the method 220 can include receiving a number of data queries for a data source from a user. Receiving the number of data queries can include receiving data queries from a user utilizing a query engine (e.g., query engine 104, etc.). Monitors can be utilized to determine attributes (e.g., dimensions, filtering conditions, etc.) for each of the number of queries as described herein.

At box 224 the method 220 can include developing a dimension relation graph based on attributes of the number of data queries. Developing the dimension relation graph can include generating a number of nodes. The number of nodes can each include a number of attributes based on a corresponding data query. For example, a particular query can include fetching data from multiple partitions within a data source. In this example, a node can be generated for each of the multiple partitions where data was fetched. In the same example, each generated node can include attributes relating to the data fetched within the corresponding partition.

Each of the number of generated nodes can be linked by a number of vertices when the nodes are included in the same query by a user. For example, a particular query can include data that relates to particular attributes that is retrieved from two partitions within the data source. In this example, a node can be generated for each of the two partitions and a vertex can link the two nodes since they were included in the same query.

Each of the number of nodes and linking vertices can be given a weight value. The number of nodes can be given a weight based on a frequency of the attributes within the data source. For example, the attributes within a particular node can correspond to a frequency (e.g., quantity, etc.) of attributes within the data source. In this example, the greater the frequency of the attributes within the data source the greater the weight can be given to the node. The vertices that link the number of nodes that are within the same query can also be given a weight value. The weight value given to the vertices can correspond to a frequency that two particular nodes are requested within the same query. For example, two nodes can correspond to the same query request by a user. In this example, the weight given to the vertices that links the two nodes can correspond to a number of times that a user requests a query that includes the two nodes.

The weight values given to the number of nodes and linking vertices can be used to determine nodes and/or data that are frequently utilized together in queries by a particular user and/or group of users (e.g., user community, multiple users, etc.). The weight values can be dynamically updated in real time to reflect changes in end user behavior.

At box 226 the method 220 can include partitioning the data source based on the dimension relation graph. Partitioning the data source based on the dimension relation graph can include utilizing the weight values of the number of nodes and the weight values of the vertices linking the number of nodes to determine partitions within the data source that include data most commonly queried by a user within the same query.

By partitioning the data source to include data most commonly queried together by a user within a single partition can increase the performance of retrieving data from the data source utilizing a query engine. In addition, by partitioning the data source based on the dimension relation graph the data source can be customized based on end user behavior. Furthermore, by partitioning the data source based on the dimension relation graph the data source can be adaptive to changes in end user behavior.

Figure 3:
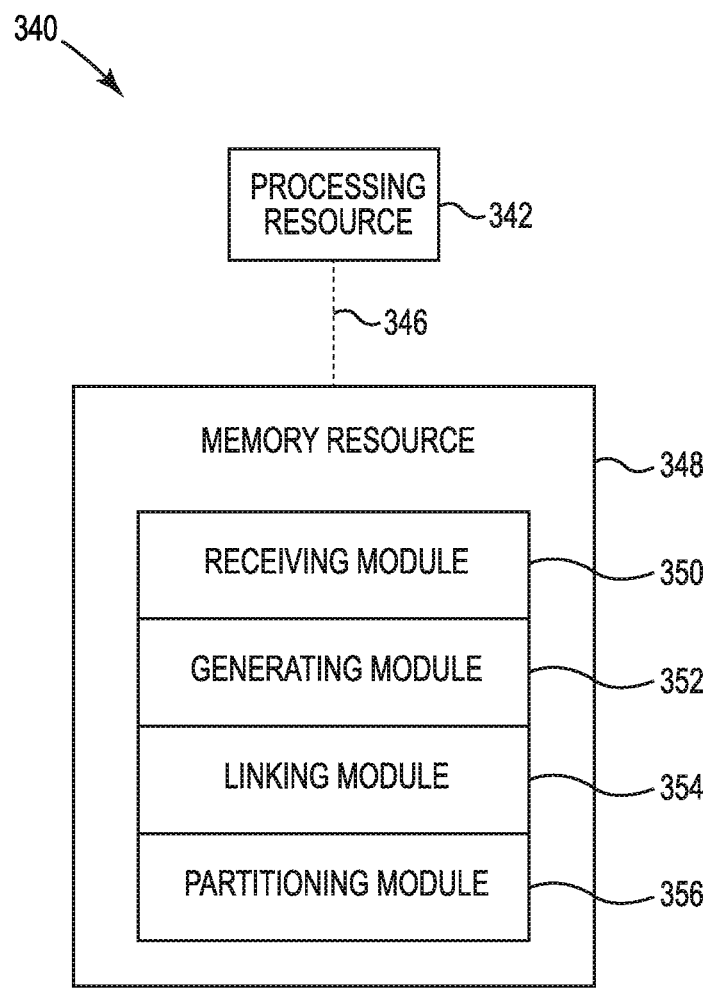
FIG. 3 illustrates a diagram of an example of a system according to the present disclosure.

FIG. 3 illustrates a block diagram of an example of a system 340 according to the present disclosure. The system 340 can utilize software, hardware, firmware, and/or logic to perform a number of functions described herein.

The system 340 can be any combination of hardware and program instructions configured to share information. The hardware, for example can include a processing resource 342 and/or a memory resource 348 (e.g., computer-readable medium (CRM), machine readable medium (MRM), database, etc.) A processing resource 342, as used herein, can include any number of processors capable of executing instructions stored by a memory resource 348. Processing resource 342 may be integrated in a single device or distributed across multiple devices. The program instructions (e.g., computer-readable instructions (CRI)) can include instructions stored on the memory resource 348 and executable by the processing resource 342 to implement a desired function (e.g., generate a number of nodes based on the number of attributes, etc.).

The memory resource 348 can be in communication with a processing resource 342. A memory resource 348, as used herein, can include any number of memory components capable of storing instructions that can be executed by processing resource 342. Such memory resource 348 can be a non-transitory CRM. Memory resource 348 may be integrated in a single device or distributed across multiple devices. Further, memory resource 348 may be fully or partially integrated in the same device as processing resource 342 or it may be separate but accessible to that device and processing resource 342. Thus, it is noted that the system 340 may be implemented on a user and/or a participant device, on a server device and/or a collection of server devices, and/or on a combination of the user device and the server device and/or devices.

The processing resource 342 can be in communication with a memory resource 348 storing a set of CRI executable by the processing resource 342, as described herein. The CRI can also be stored in remote memory managed by a server and represent an installation package that can be downloaded, installed, and executed. Processing resource 342 can execute CRI that can be stored on an internal or external memory resource 348. The processing resource 342 can execute CRI to perform various functions, including the functions described with respect to FIGS. 1 and 2. For example, the processing resource 342 can execute CRI to partition the data source based on the dimension relation graph.

The memory resource 348, as used herein, can include volatile and/or non-volatile memory. Volatile memory can include memory that depends upon power to store information, such as various types of dynamic random access memory (DRAM), among others. Non-volatile memory can include memory that does not depend upon power to store information. The memory resource 348 can be integral, or communicatively coupled, to a computing device, in a wired and/or a wireless manner. For example, the memory resource 348 can be an internal memory, a portable memory, a portable disk, or a memory associated with another computing resource (e.g., enabling CRIs to be transferred and/or executed across a network such as the Internet).

The memory resource 348 can be in communication with the processing resource 342 via a communication link (e.g., path) 346. The communication link 346 can be local or remote to a machine (e.g., a computing device) associated with the processing resource 342. Examples of a local communication link 346 can include an electronic bus internal to a machine (e.g., a computing device) where the memory resource 348 is one of volatile, non-volatile, fixed, and/or removable storage medium in communication with the processing resource 342 via the electronic bus.

The communication link 346 can be such that the memory resource 348 is remote from the processing resource (e.g., 342), such as in a network connection between the memory resource 348 and the processing resource (e.g., 342). That is, the communication link 346 can be a network connection. Examples of such a network connection can include a local area network (LAN), wide area network (WAN), personal area network (PAN), and the Internet, among others. In such examples, the memory resource 348 can be associated with a first computing device and the processing resource 342 can be associated with a second computing device (e.g., a Java® server). For example, a processing resource 342 can be in communication with a memory resource 348, wherein the memory resource 348 includes a set of instructions and wherein the processing resource 342 is designed to carry out the set of instructions.

A number of modules 350, 352, 354, 356, can include CRI that when executed by the processing resource 342 can perform a number of functions. The number of modules 350, 352, 354, 356 can be sub-modules of other modules. For example, the receiving module 350 and the generating module 352 can be sub-modules and/or contained within the same computing device. In another example, the number of modules 350, 352, 354, 356 can comprise individual modules at separate and distinct locations (e.g., CRM, etc.).

A receiving module 350 can include CRI that when executed by the processing resource 342 can receive a number of data queries for a data source from a user, wherein each of the number of data queries includes a number of attributes. The receiving module 350 can include CRI that when executed by the processing resource can monitor the data queries of a user and corresponding attributes to use to generate a number of nodes based on the number of attributes.

A generating module 352 can include CRI that when executed by the processing resource 342 can generate a number of nodes based on the number of attributes. Each of the number of nodes can be given a weight based on a frequency of attributes within the data source. In addition, each of the number of nodes can comprise attributes from a different partition of the data source.

A linking module 354 can include CRI that when executed by the processing resources 342 can link the number of nodes utilizing a number of vertices based on the number of data queries to develop a dimension relation graph, wherein the number of vertices are given a weight based on a frequency of the number of data queries that comprise the linked number of nodes. The number of vertices can be dynamically given an updated weight based on real time frequency of the number of data queries.

The partitioning module 356 can include CRI that when executed by the processing resource 342 can partition the data source based on the dimension relation graph. The partitioning module 356 can include CRI that when executed by the processing resource 342 can partition the data source into partitions that include data that is retrieved together for common query requests by the user. The partitioning module 356 can include CRI that when executed by the processing resource 342 can partition the data source into a number of balanced partitions that can optimize performance by including data most commonly retrieved by the user within the same query.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method performed by a system comprising a hardware processor, comprising:

developing a dimension relation graph based on attributes of a plurality of data queries, wherein the developing comprises:
generating a plurality of nodes corresponding to the attributes and generating vertices linking the plurality of nodes,
assigning a respective weight to each respective vertex of the vertices, wherein the respective weight is based on a quantity of data queries that include attributes of respective nodes linked by the respective vertex, the quantity of data queries being part of the plurality of data queries, and the respective nodes being part of the plurality of nodes; and
partitioning a data source based on the respective weights assigned to the vertices of the dimension relation graph.

2. The method of claim 1, wherein the generating of the vertices comprises generating a first vertex to connect a first node and a second node of the plurality of nodes in response to determining that the first node and the second node are requested in a same data query of the plurality of data queries.

3. The method of claim 1, further comprising:
receiving further data queries; and
updating the dimension relation graph based on the further data queries, the updating comprising updating one or more of the plurality of nodes and the vertices.

4. The method of claim 1, further comprising:
determining, based on the respective weights assigned to the vertices of the dimension relation graph, a portion of the attributes of the plurality of data queries that are most frequently utilized together,
wherein the partitioning of the data source results in data comprising the portion of the attributes of the plurality of data queries being located in a same partition of the data source.

5. The method of claim 4, further comprising:
assigning a respective weight to each respective node of the plurality of nodes, the respective weight assigned to the respective node being based on a frequency of attributes in the respective node,
wherein the determining of the portion of the attributes of the plurality of data queries that are most frequently utilized together is further based on the respective weights assigned to the plurality of nodes.

6. The method of claim 4, wherein the developing comprises:
generating vertices that link attributes within a first node of the plurality of nodes,
assigning weights to the vertices that link the attributes within the first node,
assigning a weight to the first node based on the weights assigned to the vertices that link the attributes within the first node,
wherein the determining of the portion of the attributes of the plurality of data queries that are most frequently utilized together is further based on the weight assigned to the first node.

7. A non-transitory machine-readable medium storing instructions that upon execution cause a computer to:
develop a dimension relation graph by:
generating nodes comprising attributes of a plurality of queries,
linking the nodes utilizing vertices, wherein a vertex of the vertices links a first node and a second node of the nodes responsive to a query of the plurality of queries including attributes of the first node and the second node, and assigning a respective weight to each respective vertex of the vertices based on a respective quantity of queries that include attributes of nodes linked by the respective vertex;

determine, based on the respective weights assigned to the vertices of the dimension relation graph, a portion of the attributes of the plurality of queries that are most frequently utilized together; and partition a data source based on the dimension relation graph so that data comprising the portion of the attributes of the plurality of queries is located in a same partition of the data source.

8. The non-transitory machine-readable medium of claim 7, wherein the instructions upon execution cause the computer to assign a weight to a respective node of the nodes based on a frequency of the attributes of the respective node.

9. The non-transitory machine-readable medium of claim 7, wherein the instructions upon execution cause the computer to partition the data source by partitioning the data source into a number of balanced partitions based on the dimension relation graph.

10. The non-transitory machine-readable medium of claim 7, wherein the vertex linking the first node and the second node represents a relation between the attributes of the first node and the second node.

11. The non-transitory machine-readable medium of claim 10, wherein the relation is based on occurrence of the attributes of the first node and the second node being within a same query.

12. A system comprising:
a processor; and
a non-transitory machine readable medium storing instructions executable on the processor to:
generate nodes comprising attributes of a plurality of queries;
link the nodes utilizing vertices based on the plurality of queries to develop a dimension relation graph;
assign a respective weight to each respective vertex of the vertices based on a frequency of queries that comprise nodes linked by the respective vertex;
determine, based on the respective weights assigned to the vertices of the dimension relation graph, a portion of the attributes of the plurality of queries that are most frequently queried together; and
partition a data source based on the dimension relation graph so that data comprising the portion of the attributes of the plurality of queries is located in a same partition of the data source.

13. The system of claim 12, wherein the instructions are executable on the processor to dynamically update the respective weights assigned to the vertices based on further received queries.

14. The system of claim 12, wherein the instructions are executable on the processor to assign a weight to each node of the nodes.

15. The system of claim 14, wherein the instructions are executable on the processor to partition the data source based on the dimension relation graph based on utilizing the weights assigned to the nodes and the respective weights assigned to the vertices.

16. The system of claim 12, wherein each node of the nodes comprises attributes from a different partition of the data source.

17. The system of claim 12, wherein the data source comprises a database, a collection of data, a distributed cache, a flat file, or a combination thereof.

18. The system of claim 12, wherein the instructions are executable on the processor to receive the plurality of queries for the data source from a user.

19. The system of claim 18, wherein the instructions are executable on the processor to partition the data source by creating multiple distinct partitions of the data source that are customized for the user.

20. The system of claim 12, wherein the instructions are executable on the processor to partition the data source so that the portion of the attributes of the plurality of queries is included in a single partition.

\* \* \* \* \*